(12) United States Patent
Lee et al.

(10) Patent No.: US 11,198,953 B2
(45) Date of Patent: Dec. 14, 2021

(54) METHOD FOR SEPARATING UNREACTED MONOMER FROM MIXTURE SOLUTION INCLUDING UNREACTED MONOMER

(71) Applicant: LG CHEM, LTD., Seoul (KR)

(72) Inventors: Jae Ik Lee, Daejeon (KR); Sung Jin Yoo, Daejeon (KR); Jeong Seok Lee, Daejeon (KR); Mi Kyung Kim, Yuseong-gu (KR)

(73) Assignee: LG CHEM, LTD., Seoul (KR)

( * ) Notice: Subject to any disclaimer, the term of this patent is extended or adjusted under 35 U.S.C. 154(b) by 55 days.

(21) Appl. No.: 16/623,162

(22) PCT Filed: Dec. 24, 2018

(86) PCT No.: PCT/KR2018/016573
§ 371 (c)(1),
(2) Date: Dec. 16, 2019

(87) PCT Pub. No.: WO2019/132470
PCT Pub. Date: Jul. 4, 2019

(65) Prior Publication Data
US 2021/0140072 A1     May 13, 2021

(30) Foreign Application Priority Data

Dec. 28, 2017  (KR) .................. 10-2017-0181830

(51) Int. Cl.
*B01D 3/14* (2006.01)
*D01F 13/00* (2006.01)
*B01D 3/32* (2006.01)
*B01D 5/00* (2006.01)
*D01F 6/54* (2006.01)

(52) U.S. Cl.
CPC ............. *D01F 13/00* (2013.01); *B01D 3/143* (2013.01); *B01D 3/32* (2013.01); *B01D 5/006* (2013.01); *D01F 6/54* (2013.01)

(58) Field of Classification Search
CPC .......... B01D 3/143; B01D 3/32; B01D 5/006; D01F 13/00; D01F 6/54
See application file for complete search history.

(56) References Cited

U.S. PATENT DOCUMENTS

| | | | | |
|---|---|---|---|---|
| 4,238,295 A | * | 12/1980 | Odom .................... | C07C 253/34 203/83 |
| 4,626,321 A | * | 12/1986 | Grethlein ............. | B01D 1/2856 202/158 |
| 4,961,826 A | * | 10/1990 | Grethlein ............... | B01D 3/146 203/19 |
| 5,035,776 A | * | 7/1991 | Knapp .................... | C07C 29/84 203/19 |

(Continued)

FOREIGN PATENT DOCUMENTS

| CN | 101058541 A | 10/2007 |
|---|---|---|
| CN | 101239247 A | 8/2008 |

(Continued)

*Primary Examiner* — Jonathan Miller
(74) *Attorney, Agent, or Firm* — Dentons US LLP (57) ABSTRACT

The present invention relates to an energy saving method for separating an unreacted monomer, by which an unreacted monomer may be easily recovered from a mixture solution including an unreacted monomer, and a separation system which is capable of performing the method.

13 Claims, 2 Drawing Sheets

(56) References Cited

U.S. PATENT DOCUMENTS

| | | | |
|---|---|---|---|
| 5,124,004 A * | 6/1992 | Grethlein | B01D 3/146 203/19 |
| 6,171,449 B1 * | 1/2001 | Welch | B01D 3/146 202/154 |
| 6,527,917 B1 | 3/2003 | Kohno et al. | |
| 8,585,870 B2 * | 11/2013 | Basham | C01C 3/0212 203/29 |
| 8,742,186 B2 | 6/2014 | Gartside et al. | |
| 9,079,810 B2 | 7/2015 | Gartside et al. | |
| 9,770,674 B2 * | 9/2017 | Lee | C07C 7/04 |
| 2010/0197987 A1 | 8/2010 | Almering | |
| 2011/0046425 A1 | 2/2011 | Gartside et al. | |
| 2011/0130604 A1 * | 6/2011 | Gartside | C07C 5/2506 585/324 |
| 2014/0314634 A1 | 10/2014 | Gartside et al. | |
| 2016/0082363 A1 * | 3/2016 | Lee | C07C 9/15 203/21 |
| 2016/0184732 A1 | 6/2016 | Schwint et al. | |

FOREIGN PATENT DOCUMENTS

| | | |
|---|---|---|
| CN | 101792363 A | 8/2010 |
| CN | 105229119 A | 1/2016 |
| EP | 0012039 A2 | 6/1980 |
| JP | 2000044606 A | 2/2000 |
| JP | 2000336115 A | 12/2000 |
| JP | 2011063553 A | 3/2011 |
| KR | 10-19840000847 B | 3/1984 |
| KR | 10-20150016137 A | 11/2015 |
| WO | 2009/136985 A2 | 11/2009 |
| WO | 2014098816 A1 | 6/2014 |

* cited by examiner

METHOD FOR SEPARATING UNREACTED MONOMER FROM MIXTURE SOLUTION INCLUDING UNREACTED MONOMER

The present application is a National Phase entry pursuant to 35 U.S.C. § 371 of International Application No. PCT/KR2018/016573 filed Dec. 24, 2018, and claims priority to and the benefit of Korean Patent Application No. 10-2017-0181830, filed on Dec. 28, 2017 in the Korean Intellectual Property Office, the disclosures of which are incorporated herein in their entirety by reference.

FIELD

The present invention relates to an energy saving method for separating an unreacted monomer, by which an unreacted monomer may be easily separated and recovered from a mixture solution including an unreacted monomer, and a separation system for performing the method.

BACKGROUND

Polyacrylonitrile (hereinafter, will be referred to as PAN)-based fiber has excellent chemical resistance and climate resistance and is applied to an industrial material such as a filter. The PAN-based fiber has a high melting point due to the high polarity of a nitrile group and the consequent bonding mechanism and crosslinking mechanism among dipoles, and is widely used as the precursor of carbon fiber.

PAN-based fiber is prepared by polymerizing a monomer raw material including acrylonitrile as a main component, dissolving the polymer thus obtained in an aprotic polar solvent to prepare a polymer solution, spinning the polymer solution in a coagulation bath containing an aqueous coagulation liquid, and washing as necessary. In this case, an unreacted monomer which did not participate in the reaction is extracted and mixed with the aprotic polar solvent and the aqueous coagulation liquid in the coagulation bath and remain.

The unreacted monomer is a loss of raw material and becomes a factor increasing the manufacturing cost. In case of discarding the unreacted monomer, expenses may be also generated and economic feasibility may be degraded. Accordingly, in order to increase the economic feasibility of PAN-based fiber in the preparation process, technology for recovering and reusing unreacted monomer is required.

Therefore, in a preparation process of PAN-based fiber, a method for recovering and reusing an unreacted monomer is under investigation.

For example, Japanese Laid-open Patent No. 2000-044606 A suggests a recovery method by vaporizing an unreacted monomer from a polymerization solution before spinning, and Japanese Laid-open Patent No. 2000-336115 A suggests a method of directly reusing a waste solution including a recovered unreacted monomer as a raw material without separation. However, in case of vaporizing and recovering the unreacted monomer from the polymer solution before spinning, the complete recovery of the unreacted monomer is difficult, and in case of reusing the waste solution including the recovered unreacted monomer without separation as a raw material, a large amount of impurities may present, and thus, the quality of the PAN-based fiber thus prepared may be deteriorated.

In addition, the aqueous coagulation liquid in the waste solution forms an azeotrope with the unreacted monomer, and the separation of each pure component by simple distillation is difficult.

Accordingly, in order to secure the economic feasibility of the preparation process of the PAN-based fiber, the development of a method for easily separating and recovering an unreacted monomer as a pure component from a waste solution produced during the preparation process of the PAN-based fiber, without consuming excessive energy, is required.

SUMMARY

An aspect of the present invention is to solve the limitations of the prior art and to provide an energy saving method for separating an unreacted monomer, by which an unreacted monomer may be easily separated and recovered from a mixture solution including an unreacted monomer such as acrylonitrile, for example, from a waste solution produced during the preparation process of a polyacrylonitrile-based fiber.

Another aspect of the present invention is to provide a separation system which is capable of performing the method for separating an unreacted monomer.

To solve the above tasks, there is provided a method for separating an unreacted monomer, including a step of injecting a mixture solution including an unreacted monomer, an aprotic polar solvent and water into a first distillation column, recovering a first fraction including the unreacted monomer and a first water fraction from an overhead, and recovering a second fraction including the aprotic polar solvent and a second water fraction from a bottom (step 1); and a step of injecting the first fraction into a second distillation column and recovering a water-rich fraction from an overhead and an unreacted monomer-rich fraction from a bottom (step 2), wherein heat exchange between at least a portion of the unreacted monomer-rich fraction and at least a portion of the first fraction is performed.

In addition, the present invention provides a separation system for an unreacted monomer, including a first distillation column for separating a first fraction including an unreacted monomer and a first water fraction, and a second fraction including an aprotic polar solvent and a second water fraction, from a mixture solution including an unreacted monomer including acrylonitrile, an aprotic polar solvent and water; a second distillation column for separating a water-rich fraction and an unreacted monomer-rich fraction from the first fraction; and a heat exchanger provided between an overhead of the first distillation column and a bottom of the second distillation column, wherein the heat exchanger is connected with the overhead of the first distillation column by a first fraction circulation line, and is connected with the bottom of the second distillation column by an unreacted monomer-rich fraction recovery line.

By the method for separating an unreacted monomer according to the present invention, an unreacted monomer in a pure unmixed state may be recovered from a mixture solution including the unreacted monomer, for example, a waste solution produced during the preparation process of polyacrylonitrile-based fiber, and through heat exchange between at least a portion of a first fraction recovered from the overhead of a first distillation column and at least a portion of an unreacted monomer-rich fraction recovered from the bottom of a second distillation column, at least a portion of the first fraction is condensed and easily refluxed, and by using the vapor thus produced as a heat source of the second distillation column, the calories used by a condenser and a reboiler may be decreased, and process efficiency may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION

Hereinafter, the present invention will be explained in more detail to allow for the understanding of the present invention.

Words or terms used in the specification and claims shall not be interpreted as the meaning defined in commonly used dictionaries. The words or terms should be interpreted as having a meaning that is consistent with their meaning in the technical idea of the present invention, based on the principle that an inventor may properly define the meaning of the words or terms to best explain the invention.

The term "fraction" used in the present invention represents that a certain material is divided into many groups. For example, a first water fraction and a second water fraction represent that a volume of water is divided into two, and one group is the first water fraction and the other group is the second water fraction.

The term "rich fraction" used in the present invention represents a fraction including a specific component in a fraction composed of various components or a mixture with respect to other components in a high ratio. For example, a first water-rich fraction represents a fraction including water in a high ratio with respect to other components constituting the fraction.

The term "azeotrope" used in the present invention represents a mixture in which a gas composition and a liquid composition are the same. Generally, in case of distilling a mixture solution including two or more components, the composition may change according to the boiling thereof, and through this, two components may be separated. In contrast, the azeotrope is boiled at a constant temperature without changing the composition and the compositions of gas and liquid become the same, and thus, the components may not be separated by simple distillation.

The present invention provides a method for separating an unreacted monomer for recovering and reusing an unreacted monomer, not a mixture state, but in a pure state, from a mixture solution including an unreacted monomer such as acrylonitrile and water which may form an azeotrope therewith, particularly, a waste solution produced during the preparation process of polyacrylonitrile-based fiber, by which the separation of an unreacted monomer is easy and energy is saved.

Generally, polyacrylonitrile-based fiber is prepared by polymerizing a monomer raw material including acrylonitrile as a main component, dissolving the polymer thus obtained in an aprotic polar solvent to prepare a polymer solution, discharging the polymer solution thus prepared into a coagulation bath containing water via a spinning nozzle, and treating the polymer solution which had been spun into the coagulation bath with a diffusion process of a solvent and a nonsolvent for the precipitation and gelation of the polymer. In this case, an unreacted monomer which does not participate in polymerization undergoes a spinning process and extracted to remain in a waste solution (solution remaining in the coagulation bath after spinning). Such unreacted monomer is a loss of the raw material and becomes a factor increasing the manufacturing costs. In case of discarding the unreacted monomer, charges may also be incurred and economic efficiency may be degraded.

In addition, in the waste solution, the aprotic polar solvent used during preparing the polymer solution prior to spinning and water used as an aqueous coagulation liquid, are included together with the unreacted monomer. The aprotic polar solvent and the unreacted monomer have a large difference of boiling points and may be easily separated by distillation, but since water forms an azeotrope with the unreacted monomer, the separation thereof is not achieved by simple distillation. Accordingly, even if the unreacted monomer is recovered, a mixture with water is recovered, and if this mixture is used as a monomer raw material in the preparation process of polyacrylonitrile-based fiber, water may act as an impurity, and negative implications including the deterioration of the stability of polymerization or the insufficient formation of the polymer may arise to degrade process efficiency.

Accordingly, in a preparation process of polyacrylonitrile-based fiber, in order to increase economic feasibility without degrading process efficiency, the establishment of a technique for separating an unreacted monomer from water and recovering and reusing the unreacted monomer in a pure state without consuming much energy is required.

Accordingly, the present invention provides a method for separating an unreacted monomer, by which an unreacted monomer in a pure state may be easily recovered from a mixture solution including an unreacted monomer, water which may form an azeotrope therewith, and an aprotic polar solvent, and energy consumption is decreased.

Here, the mixture solution may be a waste solution produced during the preparation process of polyacrylonitrile-based fiber, and the method for separating the unreacted monomer may be used as a method for reusing an unreacted monomer in a preparation process of polyacrylonitrile-based fiber.

The method for separating an unreacted monomer according to an embodiment of the present invention is characterized by injecting a mixture solution including an unreacted monomer, an aprotic polar solvent and water into a first distillation column, recovering a first fraction including the unreacted monomer and a first water fraction from an overhead, and recovering a second fraction including the aprotic polar solvent and a second water fraction from a bottom (step 1); and injecting the first fraction into a second distillation column and recovering a water-rich fraction from an overhead and an unreacted monomer-rich fraction from a bottom (step 2), wherein heat exchange between at least a portion of the unreacted monomer-rich fraction and at least a portion of the first fraction is performed.

In the present invention, the mixture solution may represent a waste solution (remaining solution) produced during the preparation process of polyacrylonitrile-based fiber, and particularly, the polyacrylonitrile-based fiber is prepared by polymerizing a monomer raw material having acrylonitrile as a main component to prepare a polymer, dissolving the polymer in an aprotic polar solvent to prepare a spinning solution, and spinning the spinning solution into a coagulation bath including an aqueous coagulation liquid. In this case, a solution remaining in the coagulation bath after spinning may be the mixture solution. In addition, in case of washing the acrylonitrile-based fiber prepared after the spinning, the mixture solution may include a solution remaining after the washing.

Accordingly, in the mixture solution, in addition to the unreacted monomer which did not participate in the polymerization, the aprotic polar solvent used during preparing the polymer solution and water used as the aqueous coagulation liquid may be included.

In addition, in the present invention, the unreacted monomer may represent a monomer not participating in polymerization among the monomer raw material used during the preparation process of polyacrylonitrile-based fiber, and the monomer raw material may include acrylonitrile as a main component and may further include a comonomer as necessary.

Accordingly, the unreacted monomer may include acrylonitrile, or may include acrylonitrile and a comonomer. Here, the comonomer may be an acrylic monomer, for example, the acrylic monomer may be one or more among acrylic acid, methacrylic acid, itaconic acid, crotonic acid, citraconic acid, maleic acid, and alkyl esters thereof. Particularly, the comonomer may be one or more among methyl acrylate, ethyl acrylate and butyl acrylate.

In addition, in case where the unreacted monomer includes the acrylonitrile and the comonomer, the unreacted monomer may include the acrylonitrile in 70 wt % or more, particularly, 95 wt % or more.

In addition, the aprotic polar solvent may be any one used in the art for the same purpose, without specific limitation, but may be, for example, dimethyl sulfoxide (DMSO), dimethylacetamide (DMAC) or dimethylformamide (DMF).

Step 1 is a first distillation step for separating a first fraction including an unreacted monomer and a first water fraction and a second fraction including an aprotic polar solvent and a second water fraction, from a mixture solution including an unreacted monomer, an aprotic polar solvent and water, and may include injecting the mixture solution into a first distillation column and distilling it for recovering a first fraction including an unreacted monomer and a first water fraction from an overhead, and recovering a second fraction including an aprotic polar solvent and a second water fraction from a bottom.

In addition, the first fraction separated through the first distillation step includes the unreacted monomer and the first water fraction, and may include a trace amount of the aprotic polar solvent according to circumstances, but in an amount of less than 0.5 wt %, even though included.

Step 2 is a second distillation step for separating a water-rich fraction and an unreacted monomer-rich fraction from the first fraction and may include injecting the first fraction into a second distillation column and recovering the water-rich fraction from and overhead and recovering the unreacted monomer-rich fraction from a bottom.

The unreacted monomer-rich fraction may include the unreacted monomer in 90 wt % or more, particularly, 95 wt % or more, more particularly, 100 wt % of the unreacted monomer. That is, the unreacted monomer fraction separated from a waste solution by the separation method of the present invention is mostly composed of the unreacted monomer and rarely includes water, or particularly, is composed of only the unreacted monomer.

In addition, the water-rich fraction includes water as a major component but may partially include the unreacted monomer. Accordingly, in case of directly discharging the water-rich fraction out of a system and recovering it, the unreacted monomer may be discharged together and as a result, economic feasibility may be degraded. Accordingly, the separation method according to an embodiment of the present invention may include recycling the water-rich fraction recovered from the overhead of the second distillation column to the first distillation column, and thus, the recovery ratio of the unreacted monomer may increase by the reintroduction to the first distillation step.

Meanwhile, the separation and recovery of the unreacted monomer from the waste solution is commonly performed through a distillation column, and in order to increase recovery efficiency, a condenser is provided at the top portion of the distillation column for refluxing, and a reboiler is provided at the bottom portion to supply a heat source required for distillation. However, a large amount of energy is consumed by the condenser and the reboiler and economic efficiency is not good. Accordingly, a method for improving process efficiency by decreasing energy used by the condenser and the reboiler is required.

The method for separating the unreacted monomer according to an embodiment of the present invention may improve process efficiency by heat exchanging at least a portion of the first fraction recovered from the overhead of the first distillation column and at least a portion of the unreacted monomer-rich fraction recovered from the bottom of the second distillation column.

Particularly, the separation method may include a step of heat exchanging at least a portion of the unreacted monomer-rich fraction and at least a portion of the first fraction, and in this case, the heat exchange may be performed by the temperature difference between at least a portion of the unreacted monomer and at least a portion of the first fraction.

In this case, the temperature difference may be 20° C. or less, particularly, from 10° C. to 20° C.

In addition, after the heat exchange, the at least a portion of the first fraction may be condensed and reintroduced to the overhead of the first distillation column, and the at least a portion of the unreacted monomer-rich fraction may be recovered together with the unreacted monomer-rich fraction. Vapor produced by the heat exchange may be used as a heat source of the second distillation column.

The term "at least a portion" used in the present invention represents a portion or more among the total, for example, in case of dividing into 10 parts, at least one part or more, and at least a portion of the first fraction may represent a portion of the first fraction or the total of the first fraction.

Meanwhile, the separation method according to an embodiment of the present invention may be performed by a continuous process which is cycled two or more times.

Here, the "cycle" represents a cycle by which the same process is repeated many times. For example, step 1 and step 2 of the separation method may be repeated in order many times.

Particularly, the heat exchange may be performed from the second cycle after the initial first cycle. That is, during the initial first cycle, the first distillation column may condense at least a portion of the first fraction by a separately provided condenser and reflux, and the second distillation column may be provided with a heat source by a separately provided reboiler. From the second cycle, the condenser and the reboiler may be replaced with the heat exchange between at least a portion of the first fraction and at least a portion of the unreacted monomer-rich fraction.

Through the separation method according to an embodiment of the present invention, the recovery ratio of the separated unreacted monomer may be 99% or more.

Here, the recovery ratio of the unreacted monomer represents the ratio of the amount of the unreacted monomer in the recovered unreacted monomer fraction to the amount of the unreacted monomer included in a mixture solution, and may be a calculated value though the following Mathematical Formula 1:

Unreacted monomer recovery ratio (%)={amount of unreacted monomer in unreacted monomer-rich fraction (g)}/{amount of unreacted monomer in mixture solution (g)}×100    [Mathematical Formula 1]

Meanwhile, the method for separating the unreacted monomer according to an embodiment of the present invention may be performed using a separation system which will be explained later.

The present invention provides a separation system of an unreacted monomer, by which an unreacted monomer may be separated and recovered from a mixture solution including an unreacted monomer, an aprotic polar solvent and water.

The separation system according to an embodiment of the present invention includes a first distillation column for separating a first fraction including an unreacted monomer and a first water fraction and a second fraction including an aprotic polar solvent and a second water fraction, from a mixture solution including an unreacted monomer including acrylonitrile, an aprotic polar solvent and water; a second distillation column for separating a water-rich fraction and an unreacted monomer-rich fraction from the first fraction; and a heat exchanger provided between the overhead of the first distillation column and the bottom of the second distillation column, wherein the heat exchanger is connected with the overhead of the first distillation column by a first fraction circulation line, and is connected with the bottom of the second distillation column by an unreacted monomer-rich fraction recovery line.

Hereinafter, the separation system will be explained in particular referring to FIG. 1.

Figure 1:
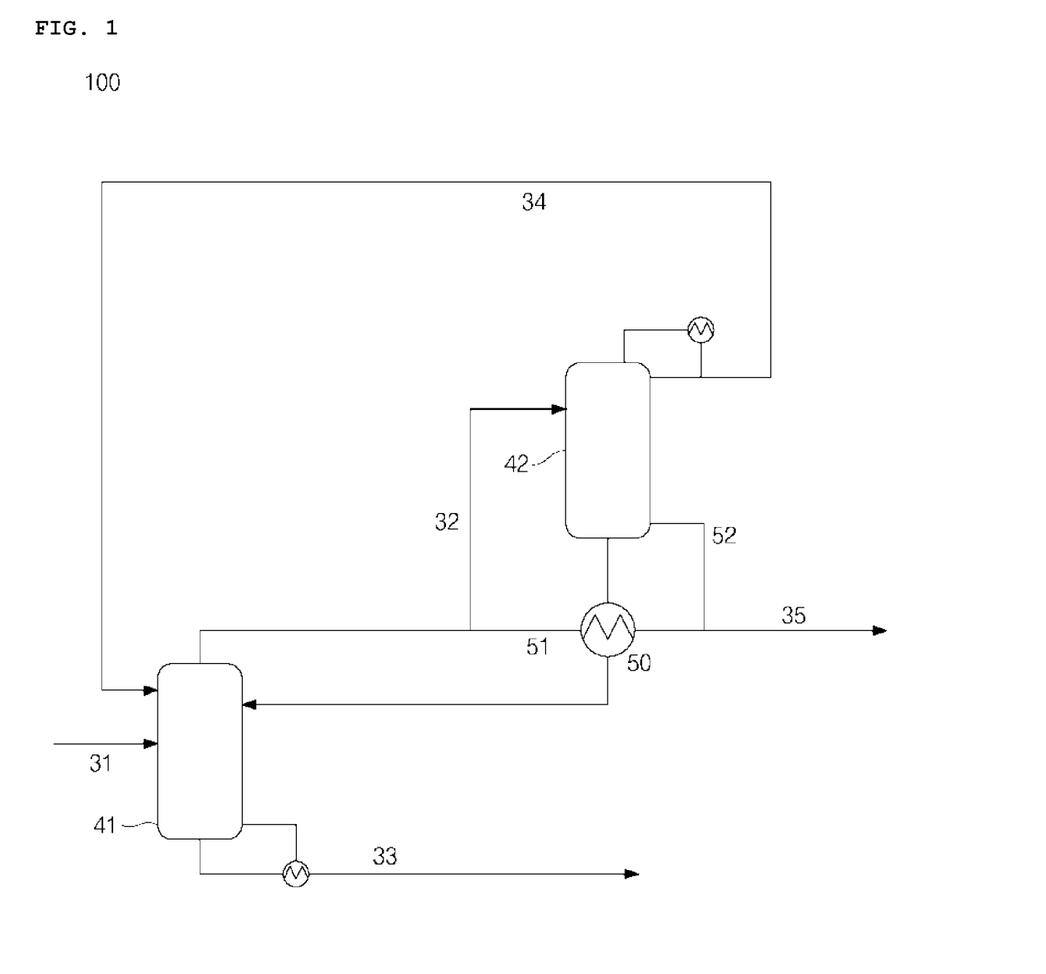
FIG. 1 schematically illustrates a separation system for separating and recovering an unreacted monomer from a mixture solution including an unreacted monomer, an aprotic polar solvent and water according to an embodiment of the present invention.

FIG. 1 schematically illustrates a separation system of an unreacted monomer, which may be used for separating and recovering an unreacted monomer from a mixture solution including an unreacted monomer, an aprotic polar solvent and water according to an embodiment of the present invention.

As shown in FIG. 1, a separation system (100) according to an embodiment of the present invention includes a first distillation column (41), a second distillation column (42) and a heat exchanger (50) provided between the overhead of the first distillation column and the bottom of the second distillation column, and may be provided with a reboiler at the bottom of the first distillation column and a condenser at the overhead of the second distillation column.

The first distillation column (41) is for separating a first fraction including an unreacted monomer and a first water fraction and a second fraction including an aprotic polar solvent and a second water fraction from a mixture solution including an unreacted monomer, an aprotic polar solvent and water, wherein a supply line (31) for supplying the mixture solution may be provided at one side portion, and at another side portion, a first fraction flow line (32) and a first fraction circulation line (51) may be provided at the overhead thereof, a second fraction flow line (33) may be provided at the bottom thereof. The first fraction circulation line (51) may be connected with the first fraction flow line (32) or connected with the overhead of the first distillation column (41) separately from the first fraction flow line (32).

The second distillation column (42) is for separating a water-rich fraction and an unreacted monomer-rich fraction from the first fraction, wherein one side portion of the second distillation column (42) may be connected with the overhead of the first distillation column (41) by the first fraction flow line (32), and at another portion, a water-rich fraction circulation line (34) may be provided at the overhead thereof, and an unreacted monomer-rich fraction recovery line (35) and a vapor introduction line (52) may be provided at the bottom thereof.

In addition, a heat exchanger (50) may be provided between the overhead of the first distillation column (41) and the bottom of the second distillation column (42), and the heat exchanger (50) may be connected with the overhead of the first distillation column (41) by the first fraction circulation line (51) and connected with the bottom of the second distillation column by the unreacted monomer-rich fraction recovery line (35). The unreacted monomer-rich fraction recovery line (35) may be protruded at the bottom of the second distillation column (42) and may be connected to the outside of a system through the heat exchanger (50).

In case where the method for separating the unreacted monomer according to an embodiment of the present invention is performed using the above-described separation system, a mixture solution including an unreacted monomer, an aprotic polar solvent and water, for example, a waste solution produced during the preparation process of polyacrylonitrile-based fiber is introduced into the first distillation column (41) through the mixture solution supply line (31) and separated into a first fraction including the unreacted monomer and a first water fraction and a second fraction including the aprotic polar solvent and a second water fraction. The first fraction is transported from the overhead of the first distillation column (41) to the second distillation column (42) by the first fraction flow line (32), and the second fraction is discharged outside of the system from the bottom of the first distillation column (41) by the second fraction flow line (33).

The first fraction transported to the second distillation column (42) is separated into an unreacted monomer-rich fraction and a water-rich fraction, and the unreacted monomer-rich fraction is transported to outside of the system at the bottom of the second distillation column (42) by the unreacted monomer-rich fraction recovery line (35) and recovered, and the water-rich fraction is transported to the overhead of the first distillation column (41) via the first water-rich fraction circulation line (34).

In this case, at least a portion of the first fraction transported from the overhead of the first distillation column (41) to the second distillation column (42) is transported to the heat exchanger (50) by the first fraction circulation line (51), and at least a portion of the unreacted monomer-rich fraction transported from the bottom of the second distillation column (42) is transported to the heat exchanger (50) by the unreacted monomer-rich fraction recovery line (35) for heat exchange from each other. The at least a portion of the first fraction is condensed and reintroduced into the first distillation column (41), and the at least a portion of the unreacted monomer-rich fraction is recovered to the outside of the system together with the remaining unreacted monomer-rich fraction, and vapor produced by the heat exchange is introduced into the second distillation column (42) by a vapor introduction line (52) and used as a heat source.

EXAMPLES

Hereinafter, the present invention will be explained in more particularly through embodiments. However, the embodiments below are for explaining the present invention more particularly, and the scope of the present invention is not limited thereto.

In the Examples and Comparative Examples below, the separation method according to the present invention was simulated using a commercial process simulation program ASPEN PLUS. Constants required for the simulation were values included in the program, values described in documents, etc.

In this case, a mixture solution was set to include acrylonitrile or methyl acrylate as an unreacted monomer, dimethyl sulfoxide as an aprotic polar solvent, and water.

Example 1

Using the separation system 100 shown in FIG. 1, a separation process of acrylonitrile and methyl acrylate, which are unreacted monomers, from a mixture solution including acrylonitrile was performed, and in this case, the separation process was performed twice continuously and at least in the first cycle, a condenser and a reboiler in the first distillation column and the second distillation column, respectively, were used and in the second cycle, heat exchange between at least a portion of a first fraction and at least a portion of an unreacted monomer-rich fraction was set to play the role of the condenser of the first distillation column and the reboiler of the second distillation column.

Particularly, the mixture solution including acrylonitrile, methyl acrylate, dimethyl sulfoxide and water was supplied to a first distillation column (41) and separated into a first fraction and a second fraction. The first fraction was separated into an unreacted monomer (acrylonitrile and methyl acrylate)-rich fraction and a water-rich fraction in a second distillation column (42), and the unreacted monomer-rich fraction was recovered by an unreacted monomer-rich fraction circulation line (35). The water-rich fraction was reintroduced into the first distillation column (41) by a water-rich fraction circulation line (34). In this way, at least the first separation process was performed and the second separation process was performed by the same method, and the role of the condenser of the first distillation column and the role of the reboiler of the second distillation column were set to be performed by the heat exchange of at least a portion of the first fraction which was transported from the overhead of the first distillation column (41) and at least a portion of an unreacted monomer-rich fraction which was transported from the bottom of the second distillation column (42). In this case, at least a portion of the first fraction was set to have a temperature increase of 13.9° C. with respect to at least a portion of the unreacted monomer-rich fraction, and the mixture solution was set to be introduced into the first distillation column (41) in total 365.62 kg/hr (acrylonitrile 2.17 kg/hr, methyl acrylate 0.15 kg/hr, water 237.17 kg/hr and dimethyl sulfoxide 126.13 kg/hr) at 4 bar and a 55° C. state. The temperature and pressure of the first distillation column (41) and the second distillation column (42) were set as shown in Table 1 below, and finally, the recovery ratio and purity of the unreacted monomer was 99.9%.

Meanwhile, in Table 1 below, set values of the temperature and pressure in each distillation column and the reboiler calorie (consumption amount) of each distillation column are shown.

TABLE 1

| Division | First distillation column | | Second distillation column | |
| --- | --- | --- | --- | --- |
| | Overhead | Bottom | Overhead | Bottom |
| Temperature (° C.) | 64.1 | 98.5 | 40.1 | 50.2 |
| Pressure (bar) | 0.773 | 0.835 | 0.287 | 0.387 |
| Reboiler calorie (Gcal/hr) | 0.154 | | 0.117 | |
| Produced calorie (Gcal/hr) | | 0.135 | | |

In Table 1, the produced calorie represents calorie by vapor produced by the heat exchange, and the reboiler calorie of the second distillation column represents the reboiler calorie used for operating the second distillation column.

As shown in Table 1, the produced calorie was 0.135 Gcal/hr and was greater than the reboiler calorie used for operating the second distillation column by 0.018 Gcal/hr, and accordingly, the process was confirmed to be easily performed without additional supplying of a heat source.

Example 2

In Example 1, an unreacted monomer was recovered with a recovery ratio and purity of 99.9% through the same method as in Example 1 except for performing a separation process by controlling the operation conditions of the first distillation column and the second distillation column as shown in Table 2 below. In this case, at least a portion of the first fraction was set to have increase in temperature of 17° C. with respect to at least a portion of an unreacted monomer-rich fraction.

Meanwhile, in Table 2 below, set values of the temperature and pressure in each distillation column, and the reboiler calorie (consumption amount) of each distillation column are shown.

TABLE 2

| Division | First distillation column | | Second distillation column | |
| --- | --- | --- | --- | --- |
| | Overhead | Bottom | Overhead | Bottom |
| Temperature (° C.) | 73.9 | 108.1 | 47.6 | 56.9 |
| Pressure (bar) | 1.107 | 1.168 | 0.400 | 0.500 |
| Reboiler calorie (Gcal/hr) | 0.192 | | 0.113 | |
| Produced calorie (Gcal/hr) | | 0.170 | | |

In Table 2, the produced calorie represents calorie by vapor produced by the heat exchange, and the reboiler calorie of the second distillation column represents the reboiler calorie used for operating the second distillation column.

As shown in Table 2, the produced calorie was 0.170 Gcal/hr and was greater than the reboiler calorie used for operating the second distillation column by 0.057 Gcal/hr, and accordingly, the process was confirmed to be easily performed without additional supplying of a heat source.

Example 3

In Example 1, an unreacted monomer was recovered with a recovery ratio and purity of 99.9% through the same method as in Example 1 except for performing a separation process by controlling the operation conditions of the first distillation column and the second distillation column as shown in Table 3 below. In this case, at least a portion of the first fraction was set to have increase in temperature of 14.4° C. with respect to at least a portion of an unreacted monomer-rich fraction.

Meanwhile, in Table 3 below, set values of the temperature and pressure in each distillation column, and the reboiler calorie (consumption amount) of each distillation column are shown.

TABLE 3

| Division | First distillation column | | Second distillation column | |
|---|---|---|---|---|
| | Overhead | Bottom | Overhead | Bottom |
| Temperature (° C.) | 59.2 | 93.8 | 33.4 | 44.8 |
| Pressure (bar) | 0.640 | 0.700 | 0.213 | 0.313 |
| Reboiler calorie (Gcal/hr) | 0.129 | | 0.094 | |
| Produced calorie (Gcal/hr) | | 0.113 | | |

In Table 3, the produced calorie represents calorie by vapor produced by the heat exchange, and the reboiler calorie of the second distillation column represents the reboiler calorie used for operating the second distillation column.

As shown in Table 3, the produced calorie was 0.113 Gcal/hr and was greater than the reboiler calorie used for operating the second distillation column by 0.019 Gcal/hr, and accordingly, the process was confirmed to be easily performed without additional supplying of a heat source.

Example 4

In Example 3, an unreacted monomer was recovered with a recovery ratio and purity of 99.9% through the same method as in Example 3 except for setting the introducing amount of total 384.97 kg/hr (acrylonitrile 20.17 kg/hr, methyl acrylate 1.5 kg/hr, water 237.17 kg/hr and dimethyl sulfoxide 126.13 kg/hr) of the mixture solution into the first distillation column (41). In this case, at least a portion of the first fraction and at least a portion of an unreacted monomer-rich fraction had a temperature difference of 14.4° C.

Meanwhile, in Table 4 below, set values of the temperature and pressure in each distillation column, and the reboiler calorie (consumption amount) of each distillation column are shown.

TABLE 4

| Division | First distillation column | | Second distillation column | |
|---|---|---|---|---|
| | Overhead | Bottom | Overhead | Bottom |
| Temperature (° C.) | 59.2 | 93.8 | 33.4 | 44.8 |
| Pressure (bar) | 0.640 | 0.700 | 0.213 | 0.313 |
| Reboiler calorie (Gcal/hr) | 0.239 | | 0.292 | |
| Produced calorie (Gcal/hr) | | 0.215 | | |

In Table 4, the produced calorie represents calorie by vapor produced by the heat exchange, and the reboiler calorie of the second distillation column represents the reboiler calorie used for operating the second distillation column.

As shown in Table 4, the produced calorie was 0.215 Gcal/hr and the reboiler calorie used for operating the second distillation column was 0.292 Gcal/hr. Though a calorie of 0.077 Gcal/hr was additionally supplied, the calorie was markedly decreased when compared with the supplying calorie in Comparative Example 2 in which a mixture solution of the same conditions was used.

Comparative Example 1

Figure 2:
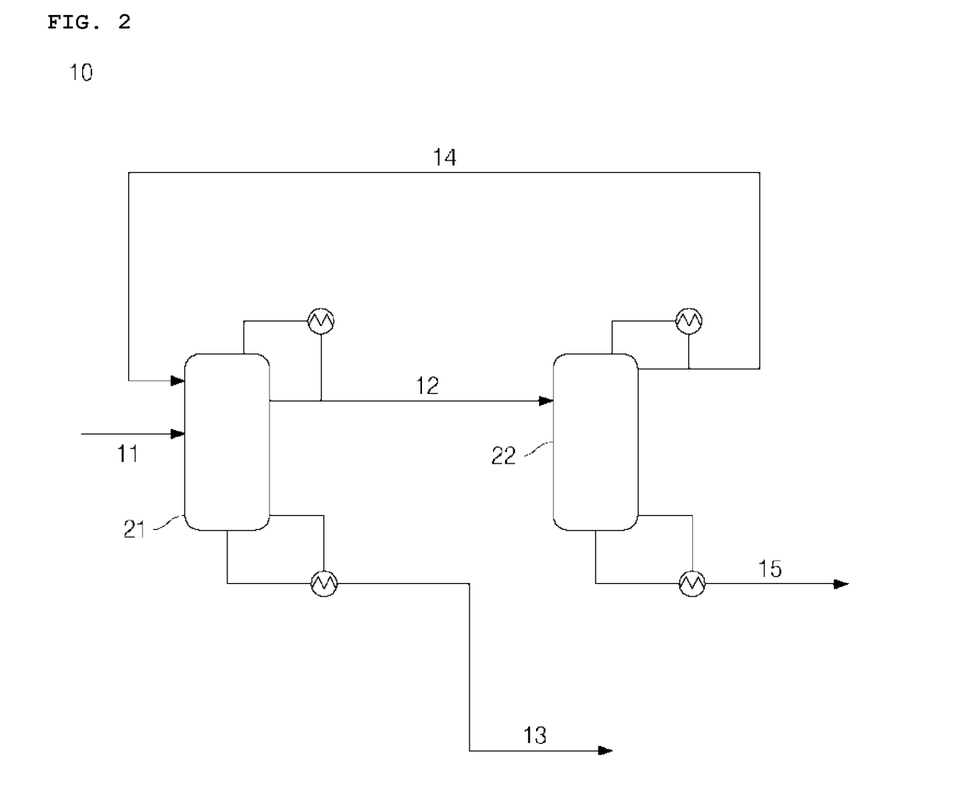
FIG. 2 schematically illustrates a separation system for separating and recovering an unreacted monomer from a mixture solution including an unreacted monomer, an aprotic polar solvent and water according to a Comparative Example in the present disclosure.

Using a separation system (10) shown in FIG. 2, acrylonitrile and methyl acrylate, which were unreacted monomers, were separated from a mixture solution including acrylonitrile.

The mixture solution including acrylonitrile, methyl acrylate, dimethyl sulfoxide and water was supplied to a first distillation column (21) and separated into a first fraction and a second fraction. The first fraction was separated into an unreacted monomer (acrylonitrile and methyl acrylate)-rich fraction and a water-rich fraction in a second distillation column (22), and the unreacted monomer-rich fraction was recovered by an unreacted monomer-rich fraction recovery line (15). The water-rich fraction was reintroduced into the first distillation column (21) by a water-rich fraction circulation line (14). In this case, the mixture solution was set to be introduced by the same conditions as in Example 1, and the temperature and pressure of the first distillation column (21) and the second distillation column (22) were set as shown in Table 5 below, and finally, the recovery ratio and purity of the unreacted monomer was 99.9%.

Meanwhile, in Table 5 below, set values of the temperature and pressure in each distillation column, and the reboiler calorie (consumption amount) of each distillation column are shown.

TABLE 5

| Division | First distillation column | | Second distillation column | |
|---|---|---|---|---|
| | Overhead | Bottom | Overhead | Bottom |
| Temperature (° C.) | 40.1 | 73.7 | 49.4 | 60.8 |
| Pressure (bar) | 0.287 | 0.315 | 0.427 | 0.577 |
| Reboiler calorie (Gcal/hr) | 0.086 | | 0.118 | |

As shown in Tables 1 to 3 and Table 5, in the separation method of Example 1, Example 2 and Example 3 according to embodiments of the present invention, reboiler calories (consumption amount) were 0.154 Gcal/hr, 0.192 Gcal/hr and 0.129 Gcal/hr, respectively, which were confirmed to decrease by 0.05 Gcal/hr (corresponding to about 25%), 0.012 Gcal/hr (corresponding to about 6%) and 0.075 Gcal/hr (corresponding to about 37%), respectively, with respect to the reboiler calorie of 0.204 Gcal/hr in the separation method of Comparative Example 1.

Comparative Example 2

In Comparative Example 1, an unreacted monomer was recovered with a recovery ratio and purity of 99.9% through the same method as in Comparative Example 1 except for setting the introduction amount of the mixture solution to the first distillation column (21) to total 384.97 kg/hr (acrylonitrile 20.17 kg/hr, methyl acrylate 1.5 kg/hr, water 237.17 kg/hr and dimethyl sulfoxide 126.13 kg/hr).

Meanwhile, in Table 6 below, set values of the temperature and pressure in each distillation column, and the reboiler calorie (consumption amount) of each distillation column are shown.

TABLE 6

| Division | First distillation column | | Second distillation column | |
|---|---|---|---|---|
| | Overhead | Bottom | Overhead | Bottom |
| Temperature (° C.) | 39.9 | 73.7 | 49.1 | 60.8 |
| Pressure (bar) | 0.287 | 0.315 | 0.427 | 0.577 |
| Reboiler calorie (Gcal/hr) | 0.144 | | 0.270 | |

As shown in Table 4 and Table 6, the reboiler calorie (consumption amount) in the separation method of Example 4 according to an embodiment of the present invention was 0.316 Gcal/hr and was confirmed to decrease by 0.098 Gcal/hr (corresponding to about 24%) with respect to the reboiler calorie of 0.414 Gcal/hr in the separation method of Comparative Example 2.

EXPLANATION ON SYMBOLS 10, 100: separation system
21, 41: first distillation column
22, 42: second distillation column
11, 31: supply line
12, 32: first fraction flow line
13, 33: second fraction flow line
14, 34: water-rich fraction circulation line
15, 35: unreacted monomer-rich fraction recovery line
50: heat exchanger
51: first fraction circulation line
52: vapor introduction line

The invention claimed is:

1. A method for separating an unreacted monomer, the method comprising:
    1) injecting a mixture solution comprising an unreacted monomer, an aprotic polar solvent and water into a first distillation column, the first distillation column comprising an overhead and a bottom, recovering a first fraction comprising the unreacted monomer and a first water fraction from the overhead of the first distillation column, and recovering a second fraction comprising the aprotic polar solvent and a second water fraction from the bottom of the first distillation column; and
    2) injecting the first fraction into a second distillation column, the second distillation column comprising an overhead and a bottom, recovering a water-rich fraction from the overhead of the second distillation column, and recovering an unreacted monomer-rich fraction from the bottom of the second distillation column,
    wherein heat exchange between at least a portion of the unreacted monomer-rich fraction and at least a portion of the first fraction is performed by a single heat exchanger in communication with both the overhead of the first distillation column and the bottom of the second distillation column.

2. The method for separating an unreacted monomer according to claim 1, wherein the heat exchange is performed by a temperature difference between the at least a portion of the unreacted monomer-rich fraction and the at least a portion of the first fraction.

3. The method for separating an unreacted monomer according to claim 1, wherein, prior to performing the heat exchange, the at least a portion of the first fraction has an elevated temperature of 10° C. to 20° C. with respect to the at least a portion of the unreacted monomer-rich fraction.

4. The method for separating an unreacted monomer according to claim 1, wherein, after performing the heat exchange, the at least a portion of the first fraction is condensed and is reintroduced into the overhead of the first distillation column.

5. The method for separating an unreacted monomer according to claim 1, wherein, after performing the heat exchange, the at least a portion of the unreacted monomer-rich fraction is recovered together with the unreacted monomer-rich fraction.

6. The method for separating an unreacted monomer according to claim 1, wherein vapor produced by the heat exchange is used as a heat source of the second distillation column.

7. The method for separating an unreacted monomer according to claim 1, wherein unreacted monomer from the unreacted monomer-rich fraction comprises 70 wt % or more of acrylonitrile.

8. The method for separating an unreacted monomer according to claim 1, wherein the unreacted monomer-rich fraction comprises 90 wt % of more of the unreacted monomer.

9. The method for separating an unreacted monomer according to claim 1, wherein the method for separating an unreacted monomer has a recovery ratio of the unreacted monomer of 99% or more.

10. The method for separating an unreacted monomer according to claim 1, wherein the water-rich fraction recovered from the overhead of the second distillation column is recycled to the first distillation column.

11. The method for separating an unreacted monomer according to claim 1, wherein the mixture solution is a waste solution produced during a preparation process of polyacrylonitrile-based fiber.

12. The method for separating an unreacted monomer according to claim 1, wherein the injecting of the mixture solution further comprises injecting the mixture solution at a single location on a side portion of the first distillation line.

13. The method for separating an unreacted monomer according to claim 1, wherein the injecting of the mixture solution further comprises injecting the mixture solution through a single supply line.

* * * * *